United States Patent Office 3,565,763
Patented Feb. 23, 1971

3,565,763
NITROGEN SOURCE FOR IMPROVED PRODUC-
TIONS OF MICROBIAL POLYSACCHARIDES
Martin C. Cadmus, Peoria, Marvin O. Bagby, Morton,
and Kermit A. Burton and Ivan A. Wolff, Peoria, Ill.,
assignors to the United States of America as represented
by the Secretary of Agriculture
No Drawing. Filed Dec. 19, 1967, Ser. No. 691,708
Int. Cl. C12b 1/00; C12d 13/02
U.S. Cl. 195—31
3 Claims

ABSTRACT OF THE DISCLOSURE

The use in fermentations of *Arthrobacter viscosus* NRRL B–1973 and other microbes such as *Xanthomonas campestris* that produce high viscosity polysaccharide gum thickeners, in an aqueous fermentation media containing glucose, inorganic salts, and as the sole nitrogen source kenaf of the waste raw juice expressed from the long fibrous shafts of the subtropical plant, *Hibiscus cannabinus* (also known as ambary hemp which provides culture liquors containing about twice as much polysaccharide and having far higher viscosities than those of prior art fermentations wherein the conventional nitrogen sources for the fermentation are respectively enzyme-hydrolyzed casein and distillers solubles.

---

A nonexclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

The widespread use as a high viscosity agent for secondary oil recoveries and as general thickeners in foods and other materials of such highly viscous microbial polysaccharide gums as were recently discovered here at the Northen Regional Research Laboratory of the U.S. Department of Agriculture to be produced by fermenting such bacterial organisms as *Xanthomonas campestris* NRRL B–1459 and *Arthrobacter viscosus* NRRL B–1973 in conventional media has stimulated research directed towards obtaining even more viscous productions of the polymer.

Another avenue of research activity at this laboratory is directed to the potentially practicable use of kenaf for the making of paper. Researches here and industrially on the kenaf fibers per se have occasionally involved the high crush pressure expression of the juice from the chopped kenaf plant, but, to our knowledge, such incidental juice heretofore has merely been discarded as a useless waste material. It is apparent, however, that if kenaf juice were to become valuable for some purpose, as in the present invention, the presently negligible cultivation of kenaf might become commercially advantageous via returns from the juice, which would eventually result in larger supplies of kenaf and lower the cost of the fibers for use in paper.

Accordingly, the principal object of our invention is an improvement in the prior art process for the production of microbial polysaccharides whereby the yield of the polysaccharide is essentially doubled and the crude culture filtrate exhibits a greatly increased viscosity.

Another object is the discovery that the heretofore worthless juice obtained by crushing the chopped shafts of the mature kenaf plant has a 5 percent to 7 percent (av. 6%) solids content of which, from Kjeldahl nitrogen values of 2.7 to 3.7 it is evident that about 20 percent of the solids content is proteinaceous, and further that the use of the kenaf juice or solids thereof in an amount equal to 0.5–1.5 percent kenaf solids in 100 ml. of the broth as the sole source of protein in otherwise conventional fermentations of *Arthrobacter viscosus* NRRL B–1973 or *Xanthomonas campestris* NRRL B–1459 unobviously results in polymer yields of about 2.0 percent–2.3 percent and viscosities exceeding 20,000 cps. for the Arthrobacter as compared with prior art maximum polymer yields of about 1.3 percent and a viscosity of less than 11,900 cps. with enzyme hydrolyzed casein as the sole source of nitrogen at the optimal casein concentration of 0.3 percent, which is essentially the same protein concentration used in the presently improved process.

The hereby achieved objects of our invention will be more fully appreciated by comparing the following specific embodiments as to Arthrobacter with the published data of Cadmus et al., Appl. Microbiol. 11:488 (1963) and of Gasdorf et al., J. Bacteriol. 90:147 (1965) and Cadmus et al., U.S. Pats. 3,228,855 and 3,314,801, and as to *Xanthomonas campestris* with the Rogovin et al. publication in J. Biochem & Microbiol Technol. Engr. 3:51 (1961).

Example 1

A portion of stock culture of *Arthrobacter viscosus* NRRL B–1973 growing on yeast malt extract (YM) agar slant was introduced into a 300 ml. Erlenmeyer flask containing 75 ml. of sterilized YM broth containing 1.0 percent glucose cf. Haynes et al., Appli. Microbiol. 3:361 (1955). After 24 hours of incubation at 25° C. on a rotary shaker, 7.5 ml. of the broth culture was introduced into another flask containing 75 ml. of broth fortified by 7.5 ml. of kenaf juice as defined below so as to condition the organism thereto. After 24 hours of fermentation at 25° C. on a 200 r.p.m. shaker, 3.75 ml. (5 percent addition) of this partially fermented material was transferred as inoculum to another flask containing 75 ml. of fermentation medium having the following percentage composition that had been adjusted to pH 7.0 with $H_2SO_4$ before being autoclaved.

| | |
|---|---|
| D-glucose | 3.0 |
| $K_2HPO_4$ | 0.4 |
| $MgSO_4 \cdot 7H_2O$ | 0.08 |
| $MnSO_4 \cdot 4H_2O$ | 0.005 |
| Kenaf juice (containing 6% solids) | 10.0 |
| Distilled water, QSAD. | 100.000 |

The inoculated medium was fermented at 25° C. on the rotary shaker for 4 days. The fermentation filtrate contained no residual glucose and exhibited a Brookfield viscosity of 19,400 cps.

The *Arthrobacter viscosus* polysaccharide was precipitated from the filtrate with 2.5 volumes of ethanol in the presence of 1 gram KCl per 100 ml. of the filtration. After reprecipitation and lyophilization, the weight yield of the dry polysaccharide was found to be 2.02 grams per 100 ml. of culture fluid.

In an identical experiment excepting that 0.3 percent of enzyme-hydrolyzed casein (optimum level) was used in place of the kenaf juice, the Brookfield viscosity of the fermented filtrate was 11,840 cps., and the yield of polysaccharide was 1.29 grams percent.

Example 2

The procedure of Example 1 was repeated with the exception that the proportion of kenaf juice in the final fermentation medium was increased by two-thirds so as to provide a kenaf juice solids concentration of 1.0 percent. The viscosity of the fermented liquor exceeded 20,000 cps. and the yield of polysaccharide was 2.24 grams percent.

Example 3

Example 1 was repeated excepting that the proportion of kenaf juice in the final fermentation medium was such as to provide a kenaf solids concentration of 1.5 percent. The viscosity of the fermented liquor exceeded 20,000 and the yield of Arthrobacter polysaccharide was 2.32 grams per 100 ml. of culture medium.

Example 4

Inoculation of 50 ml. of yeast-malt broth was made from a stock culture of YM agar slant of *Xanthomonas campestris* NRRL B–1459, and the 300 ml. Erlenmeyer flask containing the thereby inoculated broth was fermented at 28° C. for 24 hours on a reciprocal shaker. The inoculum was then transferred to a 2800 ml. Fernbach flask containing 500 ml. of sterile conditioning broth consisting, before inoculation, of 3 percent D-glucose, 0.5 percent $K_2HPO_4$, 0.02 percent $MgSO_4 \cdot 7H_2O$, 0.001 percent $MnSO_4 \cdot 4H_2O$, sufficient kenaf juice having a solids content of 5.4 percent to provide a net 0.8 percent solids content, and the balance $H_2O$, thus constituting a 10 percent inoculation. Following 24 hours of fermentation at 28° C. on the reciprocal shaker, the contents of the Fernbach were aseptically transferred to a 20 liter baffled fermentor containing 10 liters of production medium identical in composition to that present in the above Fernbach flask before the addition of the inoculum. With the constant introduction of 0.5 vol. of sterile air each minute based on the volume of fermentate, the fermentation was maintained at 28° C. for 4 days during the first of which the fermentor contents were agitated at 200 r.p.m., during the second 24 hours at 375 r.p.m., and during the final 48 hours at 425 r.p.m The crude culture liquor had a Brookfield viscosity of 9440 cps, and isolation of Polysaccharide B–1459 therefrom showed it to have contained a 2.04 weight percent yield based on the fermentate.

For comparison, we ran a prior art fermentation wherein all media prior to inoculation containing 0.8 percent of distillers solubles analyzing 4.9 percent total N and 4.6 percent soluble N in place of the kenaf juice of our invention; the yield of Polysaccharide B–1459 was only 1.57 percent and the Brookfield viscosity was only 5220 cps.

Example 5

In Erlenmeyer flask experiments wherein the kenaf juice taken from plants that had been autoclaved (thereby slightly lessening the polysaccharide-production efficiency of the juice) *Xanthomonas campestris* NRRL B–1459 was fermented for a total of 4 days in each of respective culture media containing either 0.5 percent, 0.75 percent, 1.0 percent, 1.25 percent, or 1.5 percent by weight of the kenaf juice solids. The resulting viscosities, respectively, were 2568 cps., 5680 cps., 6640 cps., 8350 cps., and 11,420 cps.

Having fully disclosed our invention, we claim:

1. A process for producing highly viscous microbial polysaccharides comprising fermenting an aerobic organism selected from the group consisting of *Xanthomonas campestris* NRRL B–1459 and *Arthrobacter viscosus* NRRL B–1973 in an aqueous fermentation medium containing glucose, inorganic salts, and as the sole nitrogen source, kenaf juice in an amount sufficient to provide a 0.5 percent to 1.5 percent kenaf juice solids concentration, based on the fermentation medium.

2. The process of claim 1 wherein the organism is *Xanthomonas campestris* NRRL B–1459.

3. The process of claim 1 wherein the organism is *Arthrobacter viscosus* NRRL B–1973.

References Cited

UNITED STATES PATENTS

| | | | |
|---|---|---|---|
| 3,228,855 | 10/1969 | Cadmus et al. | 195—31 |
| 3,455,786 | 7/1969 | Miescher | 195—31 |

A. LOUIS MONACELL, Primary Examiner

G. M. NATH, Assistant Examiner